United States Patent [19]

Toomingas

[11] Patent Number: 4,475,856
[45] Date of Patent: Oct. 9, 1984

[54] EXPANSION SCREW WITH AN EXPANSION SLEEVE HAVING AN OUTER CYLINDRICAL SURFACE AND REGIONS OF GREATER AND LESSER WALL THICKNESS

[75] Inventor: Illar Toomingas, Enskede, Sweden

[73] Assignee: Telefonaktiebolaget L M Ericsson, Stockholm, Sweden

[21] Appl. No.: 284,653

[22] PCT Filed: Dec. 16, 1980

[86] PCT No.: PCT/SE80/00334
§ 371 Date: Jul. 20, 1981
§ 102(e) Date: Jul. 20, 1981

[87] PCT Pub. No.: WO81/01870
PCT Pub. Date: Jul. 9, 1981

[30] Foreign Application Priority Data

Dec. 21, 1979 [SE] Sweden ................................ 7910573

[51] Int. Cl.³ .............................................. F16B 13/06
[52] U.S. Cl. ......................................... 411/33; 411/44; 411/47; 411/61; 411/70; 411/78; 405/259
[58] Field of Search ................. 411/15, 24–28, 411/32, 33, 42–48, 56–74, 75–80; 405/259–262

[56] References Cited

U.S. PATENT DOCUMENTS

| | | | |
|---|---|---|---|
| 1,033,447 | 7/1912 | Mower | 411/57 |
| 1,650,958 | 11/1927 | Ogden et al. | 411/52 |
| 2,180,030 | 11/1939 | Bugatti | 411/59 |

FOREIGN PATENT DOCUMENTS

| | | |
|---|---|---|
| 1814485 | 6/1970 | Fed. Rep. of Germany . |
| 2138246 | 2/1973 | Fed. Rep. of Germany . |
| 2515881 | 10/1976 | Fed. Rep. of Germany . |
| 2304813 | 10/1976 | France ................................ 411/33 |
| 46-21128 | 6/1971 | Japan ................................... 411/55 |

Primary Examiner—Thomas J. Holko
Assistant Examiner—Neill Wilson
Attorney, Agent, or Firm—Roberts Spiecens & Cohen

[57] ABSTRACT

An expansion screw for being secured in a cavity is threaded at the outer end of its screw portion for co-action with a nut (2) and is provided with an expandable sleeve (10) about its opposite end. The sleeve has an inner profile coacting with an outer profile of the expansion screw for expanding the sleeve when the screw (1) is withdrawn from the sleeve. The outer profile of the screw portion (1) is formed by a plurality of coaxial cones (3–6) with intermediate cylindrical junction portions (7–10), all cones and junction portions being integral with the rest of the screw portion. The inner profile of the sleeve (10) is formed by thickened regions (12), projecting inwards from the inner surface of the sleeve and corresponding to the cylindrical junction portions, and by thinner regions (13) of the sleeve corresponding to the coaxial cones. The thickness of the sleeve is adapted to allow portions of it to be expanded by the cones into bulges (37) extending around the sleeve, the bulges being intended to penetrate into the wall of the cavity for securing the expansion screw therein.

7 Claims, 8 Drawing Figures

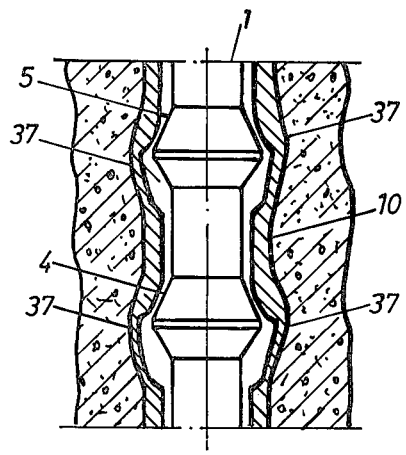
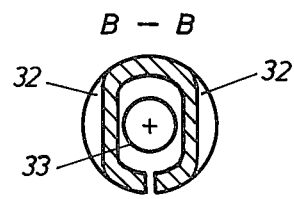
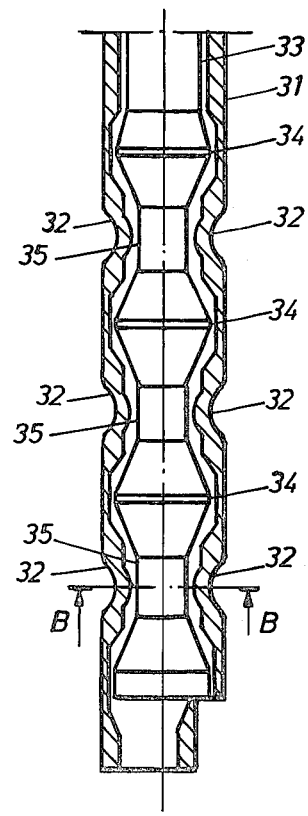
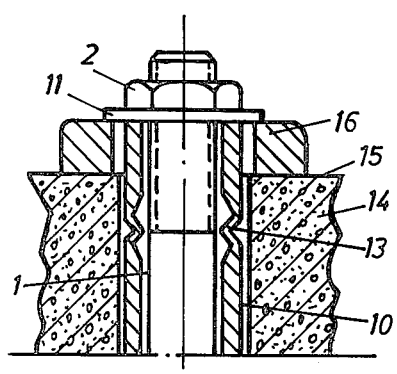

EXPANSION SCREW WITH AN EXPANSION SLEEVE HAVING AN OUTER CYLINDRICAL SURFACE AND REGIONS OF GREATER AND LESSER WALL THICKNESS

TECHNICAL FIELD

The present invention relates to an expansion screw of the adapted for being secured in a cavity and having a screw portion threaded at its outer end for co-action with a fastening element, e.g. in the form of a nut, and which is provided with an expandable sleeve having an outer cylindrical surface and an inner profile adapted to coact with the outer profile of the expansion screw for expanding the sleeve at withdrawal of the screw portion from the sleeve, the outer profile of the scew portion being formed by a plurality of co-axial cones with intermediate cylindrical junction portions, all the junction portions being made integral with the rest of the screw portion.

BACKGROUND ART

Expansion screws for insertion in holes in concrete or rock walls for retaining machine parts are well known, and are available in many different forms. Most often, an expansion screw has one, or only a few means for expanding an associated sleeve, but expansion screws with a plurality of expander cones are known, for example, from German Published Patent Application Nos. 2138246 and 1814485.

Such expansion screws with a plurality of expander cones are intended to distribute the pressure of the sleeve over a large portion of the hole wall so that the surface pressure will be kept to a low value. Among the known expansion screws, are those having a sleeve with a crennelated profile. However, such a sleeve has its profile flattened when the screw is loaded and the walls of the hole consist of a very hard material, whereby the screw can then be pulled out of the hole.

SUMMARY OF THE INVENTION

The expansion screw in accordance with the invention is characterized, inter alia, by the inner profile of the sleeve having thickened regions and attenuated regions. The sleeve thickness is adapted such that when it is expanded into contact with the wall of the hole, continued thightening of the screw portion expands a part of the sleeve's thickened portions into bulges going round the sleeve, these bulges penetrating into the wall of the hole and primarily contributing to retaining the expansion screw. With the expansion screw in accordance with the invention, the sleeve at its thickened regions can withstand very heavy pressure coming on the sleeve when the material in the hole walls is hard. Other forms of the expansion screw are also suitable when the walls of the hole consist of soft material with low strength.

BRIEF DESCRIPTION OF DRAWINGS

In the following, embodiments of expansion screws in accordance with the invention are described with reference to the appended drawing, wherein FIG. 1 diagrammatically illustrates in section a complete expansion screw;

FIG. 5 illustrates buckling in the attenuated portions of the sleeve;

FIG. 6 illustrates impressions in the thickened places of the sleeve;

FIG. 7 is a section taken along line B—B through the sleeve in FIG. 6; and

FIG. 8 illustrates an expansion bolt with an expanded sleeve.

BEST MODE FOR CARRYING OUT THE INVENTION

Figure 1:
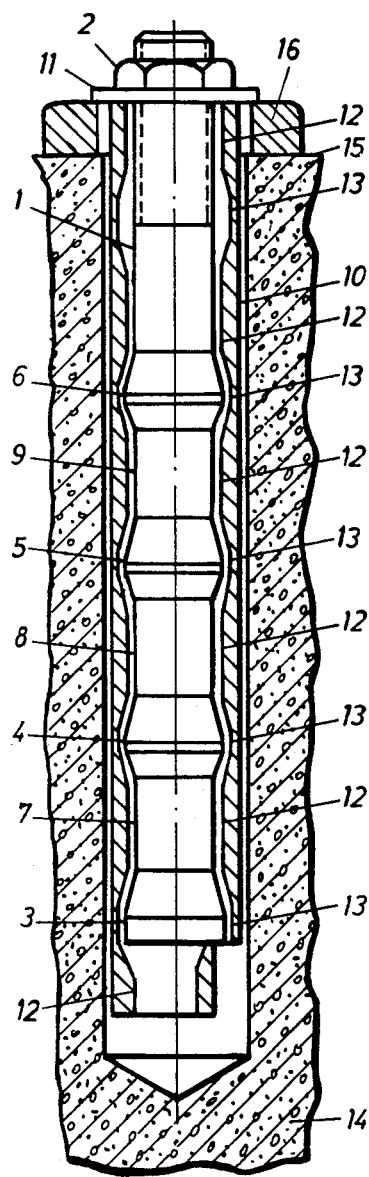

As is apparent from FIG. 1, the expansion screw includes a screw portion 1 having an outer end which is threaded in order to co-act with a fixing element. In the example shown, the screw portion is threaded externally for co-action with a nut 2, although it can be alternatively made with an axial hole threaded for co-action with a screw. The screw portion is provided with a plurality of cones, of which one cone 3, situated at the end opposite the threaded end, is directed with its minor end towards the threaded portion of the screw and is terminated at its outermost end by a short cylindrical portion. Three remaining cones 4, 5, 6, are double cones with the bases facing each other. Both cones in a double cone have approximately the same vertex angle, but can also have different vertex angles. In principle, all the bases of the cones have the same diameter, which is somewhat greater than the diameter of the threaded portion of the screw. Between the cones are cylindrical junction portions 7, 8, 9 with approximately the same diameter as the threaded portion of the screw. All cones and junction portions are integral with the screw portion 1.

The screw portion 1 is surrounded by a cylindrical expansion sleeve 10, extending over all of the expander cones and up to the nut 2, where a flat washer 11 is suitably placed to distribute the pressure of the nut on the sleeve end.

The expanding sleeve 10, illustrated in cross section in FIG. 1, extends around the circumference of the screw portion with the exception of a narrow axial slit extending along the entire length of the sleeve. The sleeve 10 is substantially cylindrical on its outside surface and formed with thickened regions 12 projecting inwardly from the inner surface of the sleeve and corresponding to the cylindrical junction portions 7–9 of the screw portion, the sleeve also being formed with attenuated or thinner regions 13, corresponding to the expander cones 3–6. The sleeve can, for example, be produced from a strip of great extension in the transverse direction of the shown sleeve, and with said thickened regions and attenuated regions running along the strip.

A variant of the sleeve 10 can be made with two or more slits, which separate the sleeve into several co-acting segments.

Figure 2:
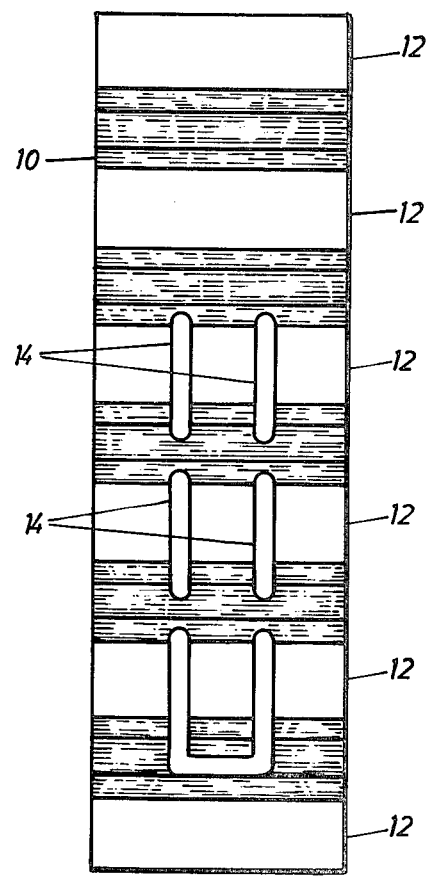
FIG. 2 illustrates development of a sleeve of the expansion screw.

As illustrated in FIG. 2, illustrating a development of the sleeve 10, the sleeve is further formed with a plurality of short slits 14 in the longitudinal direction of the sleeve over the thickened places corresponding to the cylindrical junction portions 7–9. The sleeve can thus be more easily expanded by the action of the cones than if the circumference of the sleeve were unbroken.

The expansion bolt with sleeve is intended for insertion in a hole in a wall or floor 15, see FIG. 1, and to retain an object 16, e.g. the foundation for a machine. The form of the fixing means allows it to be inserted in the drilled hole 15 while the object 16 is in place above it. Otherwise, the hole can be bored through the hole in the object to be fixed, while the object is in its intended place. When the nut 2 is tightened, the the screw portion 1 is pulled out somewhat from the sleeve 10, the expander cones 3-6 co-acting with the thickened regions 12 of the sleeve to expand the sleeve.

The thickness of the sleeve is adapted such that where the expander cones 3-6 press on the thickened regions 12 of the sleeve, and expand the sleeve into contact with the hole wall, the edges of the thickened regions, as is shown in FIG. 8, are expanded into bulges 37 extending round the sleeve 10. Upon continued tightening of the nut, the compressive force of the expander cones acting on the thickened regions will be so high that the bulges are pressed into the hole wall, whereby the entire expansion bolt is kept in the hole with great force.

Figure 3:
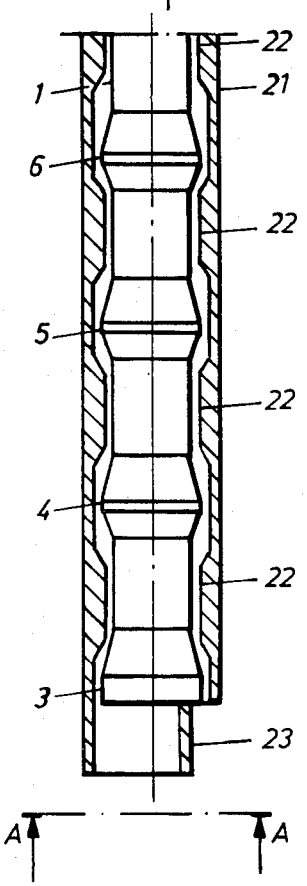
FIG. 3 illustrates an expansion screw with different spacings between the thickened regions of the sleeve and the cones of the expansion screw.

An expanding sleeve 21 in FIG. 3 can alternatively be made with greater spacing between the thickened regions 22 than between the expander cones 3-6 of the screw portion 1. With this embodiment of the sleeve, movement of the screw portion 1 in the direction of the arrow will cause the expansion of the sleeve 21 to occur first at the innermost cone 3, thereafter at the next innermost cone 4 etc. This results in increased certainty that the pressure of the sleeve on the hole walls primarily affects the interior of the hole so that risk of the hole edges being damaged is considerably reduced.

Figure 4:
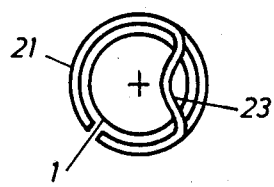
FIG. 4 is an end view of the expansion screw as seen towards its innermost end.

As is apparent from the end view of the sleeve 21 in FIG. 4, compared with FIG. 3, the sleeve is clipped up at a portion towards its end, and deformed into a support 23 for the innermost end of the expansion screw. This support 23 determines more accurately the insertion of the sleeve into the hole in the wall as compared to the action of the nut by itself on the threaded portion of the expansion screw. All the described expanding sleeves are intended to be made with one or more deformed supports 23.

When the nut 2 is screwed onto the threads of the screw portion 1, see FIG. 1, the screw will be pulled out of the expanding sleeve 10 with consequential expansion of the sleeve. Outward pulling of the screw portion presupposes a reaction force in the form of a pressure between the outer edge of the expanding sleeve and the nut 2 with its washer 11. The expansion of the sleeve 10 is determined only by the nut 2 tightening down on the threaded end of the screw portion 1, and independent of whether the sleeve at the beginning of the nut being tightened down has already become clamped between the cones of the expansion bolt and the hole walls or not. The nut with its washer will now also press on the mounted object 16. This is possible since one of the attenuated portions 13 of the sleeve, often a portion which does not surround any expander cone, is deformed in a way apparent from FIG. 5. After the innermost portions of the sleeve 10 have been clamped to the hole walls, both the screw portion 1 and sleeve are stationary. Continued tighening of the nut 2 causes the attenuated portion 13 of the sleeve to be deformed so that the outermost end of the sleeve 10 can be moved by the nut a further small distance in towards the hole. The nut and associated washer 11 can thereby be screwed so far that sufficient pressure for retaining the object 16 can be obtained.

In a further development of the invention, which is apparent from FIG. 6 and the cross section in FIG. 7, the expansion sleeve 31 is formed with indentations 32 in its thickened portions forming grooves at the outer surface of the sleeve and bulges at the inner surface of the sleeve. The screw portion 33 in this case has a plurality of double cones 34, the vertex angles of which are substantially equal. The cones in this screw portion have greater extension than in the previously described screw portions, which leads to the cylindrical junction portions 35 between the cones having less diameter than the junction portions in the previously described screw portions. The sleeve 31 is made with two indentations at each cylindrical junction portion, but the sleeve can be made with some other number of indentations than two at each place.

The indentations 32 have the effect of increasing the expansion of the sleeve when withdrawing the screw portion 33 than with the sleeve in the previously described expansion screws. This latter expansion screw is therefore especially well suited for use in rather loose building material where sufficiently strong fixing can be obtained with a large expansion of the sleeve.

I claim:

1. An expansion fastener adapted for being secured in a cavity comprising a screw portion having a threaded end, a nut threaded on said threaded end and an expandable sleeve on said screw portion, said sleeve having an outer cylindrical surface facing a wall of the cavity when the fastener is inserted into the cavity, said screw portion including integral, axially spaced conical portions defining intermediate cylindrical portions between the conical portions, said sleeve having an inner surface facing said screw portion and including a wall with thickened regions corresponding to said cylindrical portions to form projections at said inner surface of said sleeve located between adjacent spaced conical portions on said screw portion and thinner regions between said thickened regions corresponding to said conical portions to form recesses in said inner surface of said sleeve receiving said conical portions, said thinner regions being of reduced thickness compared to said thickened regions to permit greater expansion of said thickened regions than the remainder of the sleeve upon relative axial movement of said sleeve and screw portion to form outer bulges around the sleeve for pressing against the wall of the cavity to secure the fastener in the cavity, the spacing between said thickened regions of said sleeve being greater than the spacing between said conical portions of said screw portion.

2. An expansion fastener as claimed in claim 1 wherein said nut bears against said sleeve.

3. An expansion fastener as claimed in claim 1 wherein said sleeve is provided with at least one transverse groove in said outer surface at one of said thickened regions and a corresponding bulge at the inner surface of said sleeve.

4. An expansion fastener as claimed in claim 2 wherein said sleeve is provided with longitudinal slits in said thickened regions.

5. An expansion fastener as claimed in claim 1 wherein said sleeve has a longitudinal slot extending the length of the sleeve.

6. An expansion fastener as claimed in claim 1 wherein said sleeve includes an end portion remote from the end proximate the threaded end of said screw portion, said end portion of the sleeve being radially deformed to provide a support for said screw portion.

7. An expansion fastener as claimed in claim 1 wherein said conical portions each includes frusto-conical sections with facing bases.

* * * * *